March 15, 1966  F. R. PIPER  3,239,925
INTERNAL COMBUSTION ENGINE POPPET VALVE ASSEMBLY APPARATUS
Filed April 16, 1964  5 Sheets-Sheet 1
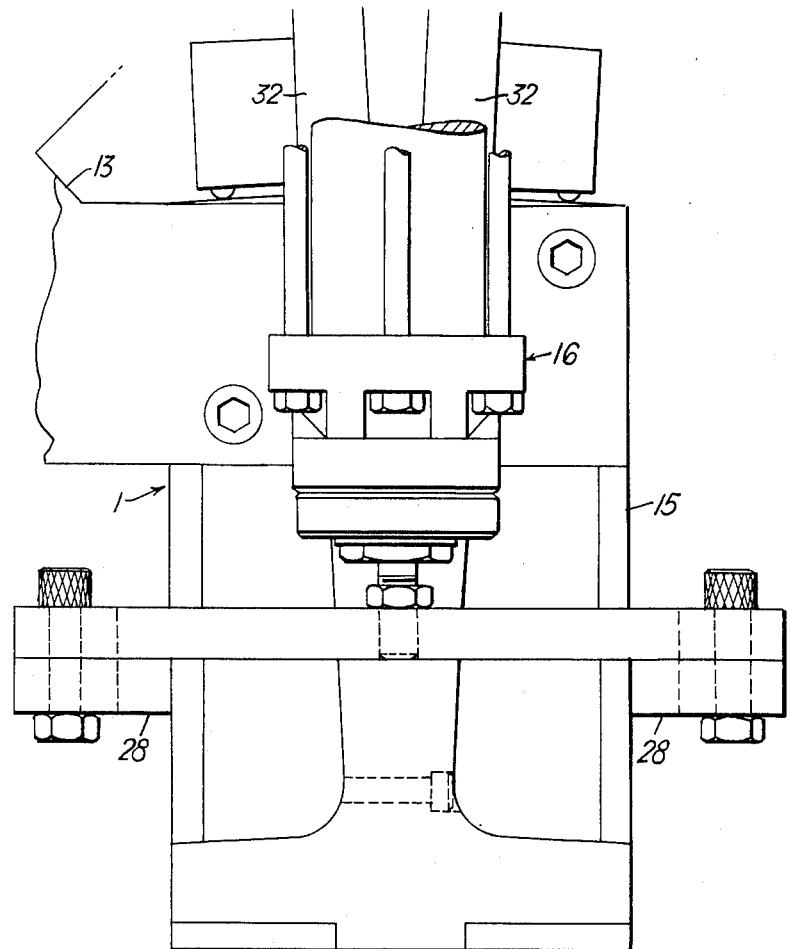
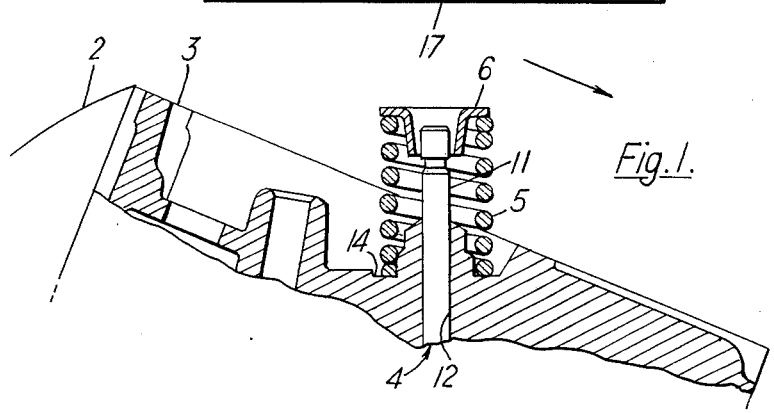
Fig. 1.
Inventor
Francis Raymond Piper
BY
E. W. Christen
Attorney March 15, 1966   F. R. PIPER   3,239,925
INTERNAL COMBUSTION ENGINE POPPET VALVE ASSEMBLY APPARATUS
Filed April 16, 1964   5 Sheets-Sheet 2
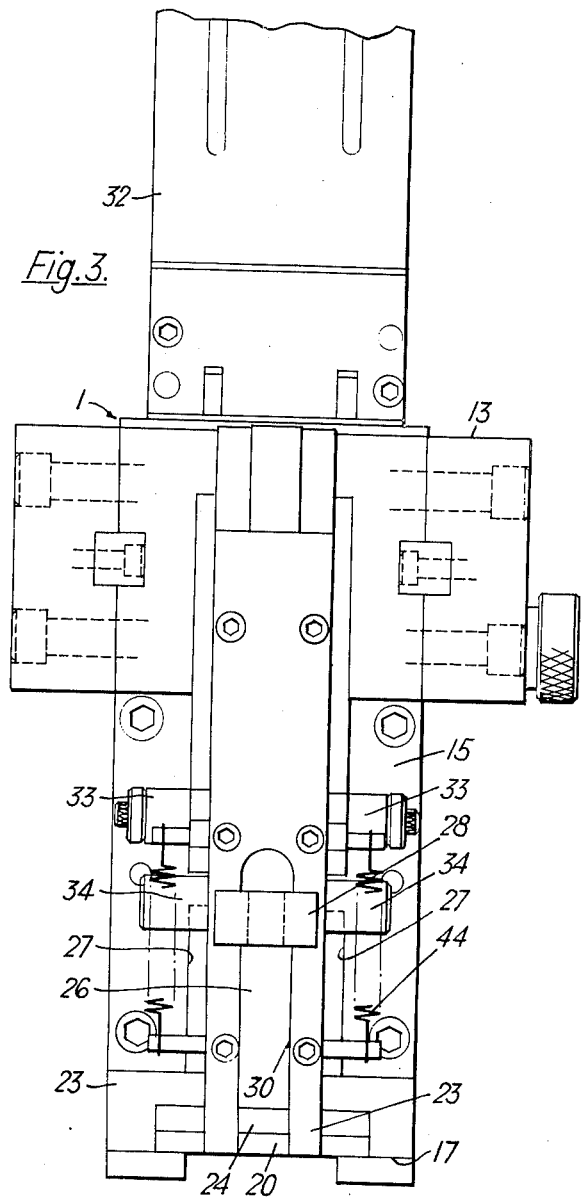
Inventor
Francis Raymond Piper
BY
E.W. Christen
Attorney

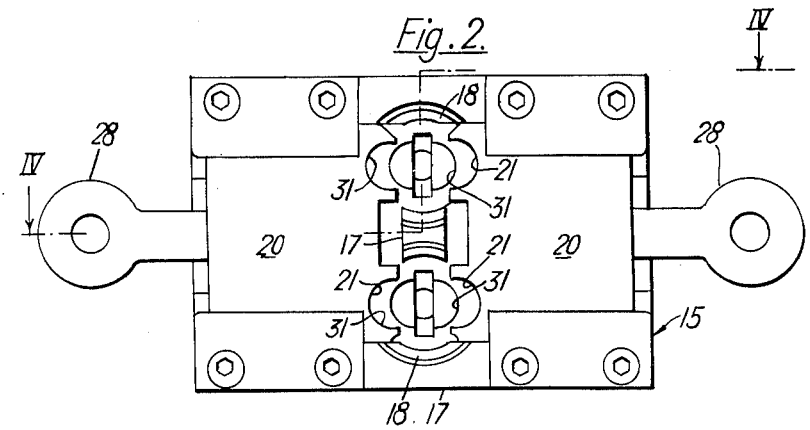
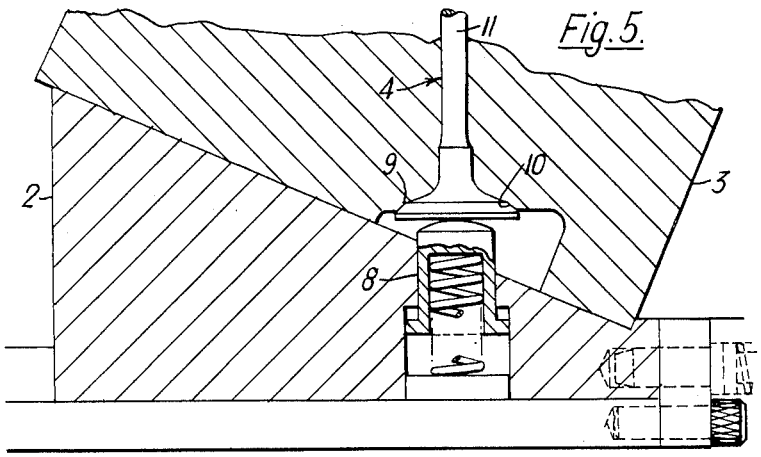
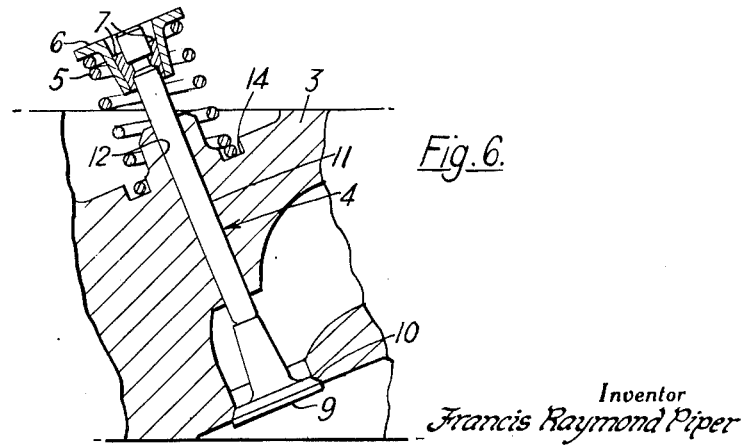

March 15, 1966 F. R. PIPER 3,239,925
INTERNAL COMBUSTION ENGINE POPPET VALVE ASSEMBLY APPARATUS
Filed April 16, 1964 5 Sheets-Sheet 5
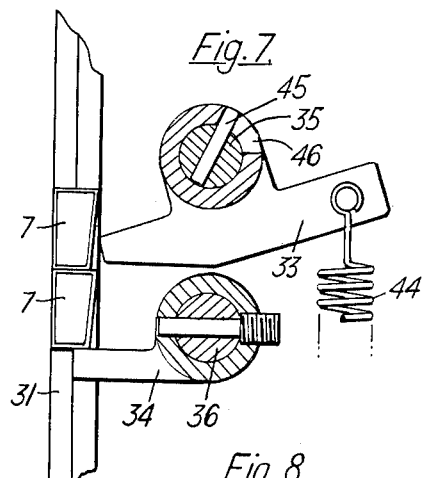
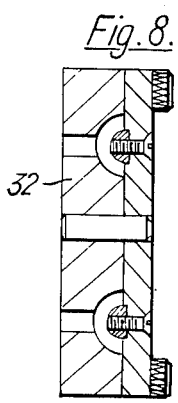
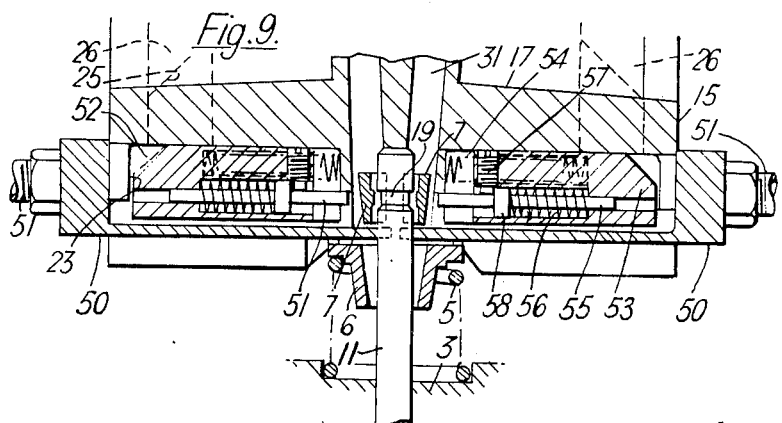
Inventor
Francis Raymond Piper
BY
E. W. Christen
Attorney United States Patent Office 3,239,925
Patented Mar. 15, 1966

3,239,925
INTERNAL COMBUSTION ENGINE POPPET
VALVE ASSEMBLY APPARATUS
Francis Raymond Piper, Luton, England, assignor to
General Motors Corporation, Detroit, Mich., a corporation of Delaware
Filed Apr. 16, 1964, Ser. No. 360,324
Claims priority, application Great Britain, Apr. 18, 1963, 15,291/63
6 Claims. (Cl. 29—208)

This invention relates to the assembly of poppet valves in internal combustion engine cylinder heads.

It is known practice at the present time to maintain the poppet valve in its normal closed position by means of a helical valve spring which is mounted about the valve stem with one end abutting the cylinder head and the other end abutting a spring retainer which is of inverted hat-section and is secured on the upper end of the valve stem by means of a split collar which is tapered to fit in the corresponding tapered bore of the spring retainer and comprises a pair of collar members each of semi-circular cross-section. Each collar has between its ends an inwardly extending radial rib which engages in an annular groove at the upper end of the valve stem, so that, when the spring retainer is engaged about the collar, and is held in such position by the valve spring, the collar members are held with their ribs engaged in the groove on the valve stem, and the retainer is locked on the collar under the wedging action of the co-operating tapered surfaces of the collar members and the retainer bore.

The assembly of the collars, spring retainers and springs on the valves is usually carried out wholly or partly by manual operations and accordingly involves a relatively large amount of time and expense.

The present invention relates in particular to a method of and apparatus for automatically assembling on a poppet valve such collars and spring retainers.

An apparatus according to the present invention for assembling on a poppet valve the split collar by which the valve spring retainer is secured on the end of the valve stem comprises a vertically reciprocatory head member under which a cylinder head is adapted to be located with a valve, valve spring and spring retainer in register thereunder, a base plate on said head member with a recessed portion adapted to engage and locate said spring retainer, a pair of carrier plates slidably mounted on said base plate and having opposed end portions adapted to engage about the upper end portion of the valve stem, a pair of feed chutes in said head for delivering a pair of split collar members on to said carrier plates at diametrically opposed positions adjacent the upper end of the valve stem and mechanism operating in timed sequence with the movement of said head so as to depress the spring retainer by means of said base plate against the resistance of the valve spring; to deliver said collar members on to said carrier plates in positions for engagement with the collar-retainer recess on the upper end of the valve stem; to press said collar members into engagement with said recess and then to release said spring retainer so that said collar members are locked on the end of said stem by the spring retainer under the compression of the valve spring between the spring retainer and the cylinder head.

The scope of the invention is defined by the appended claims; and the invention and the method by which it is to be performed are hereinafter described with reference to the accompanying drawings in which:

FIGURE 1 is a front elevation of one embodiment of an assembly apparatus according to the invention; and a part sectional elevation of a cylinder head on which a valve is to be assembled;

FIGURE 2 is an inverted plan of the assembly apparatus shown in FIGURE 1;

FIGURE 3 is a side elevation of the assembly apparatus shown in FIGURE 1; for the sake of clarity and showing the relation of the apparatus to a cylinder head on which the valve collars, spring retainers and springs are to be assembled with the valve;

FIGURE 5 is a detail sectional view of the cylinder head and its support pallet;

FIGURE 6 is a detail part sectional view of a valve, valve spring, collar and retainer assembly on a cylinder head;

FIGURE 7 is a detail, to an enlarged scale, of FIGURE 4, showing a metering mechanism for the valve collar members;

FIGURE 8 is a section on the line VIII—VIII of FIGURE 4; and

FIGURE 9 is a section, similar to that of FIGURE 4 but showing a modification of the assembly mechanism for use with cylinder heads of a different kind from that shown in FIGURES 3 and 4.

Like parts in the drawings bear similar reference numerals.

Figure 4:
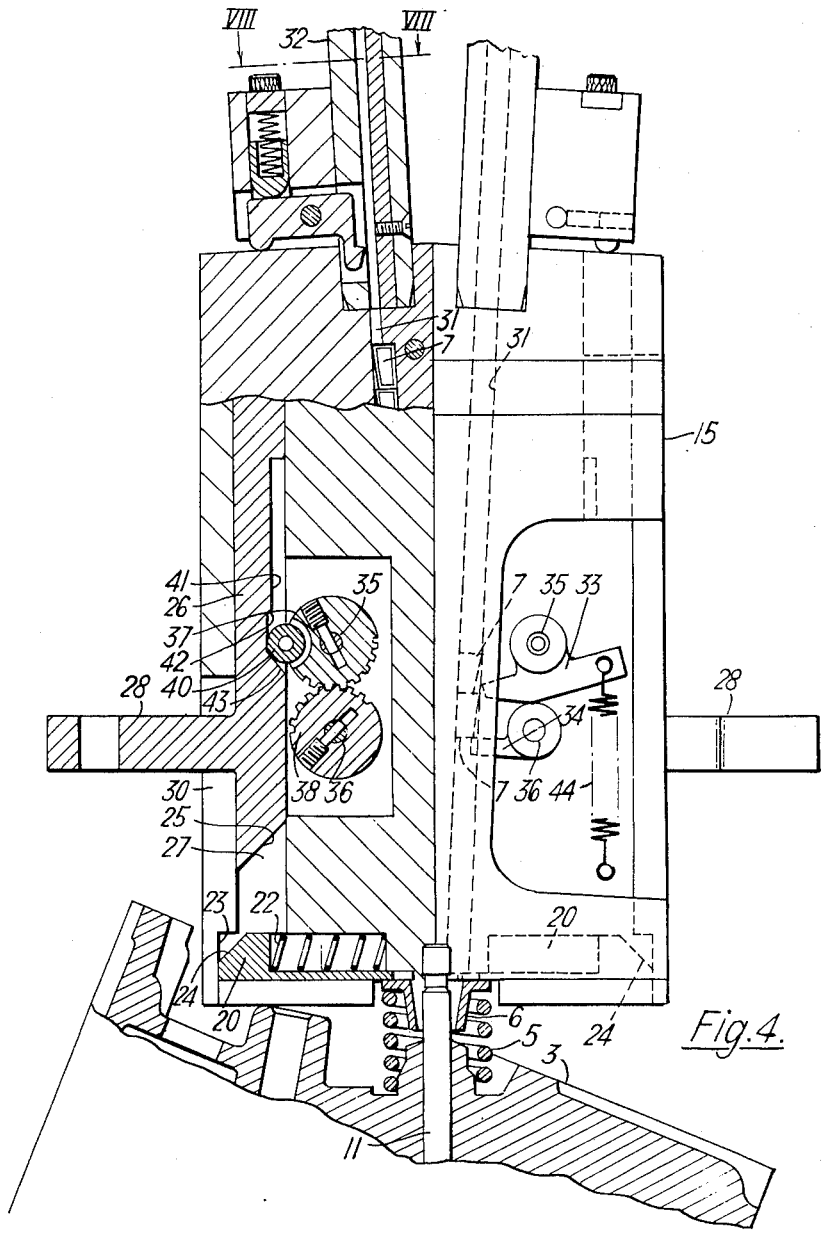
FIGURE 4 is a section on the line 4—4 of FIGURE 2, and a part sectional elevation of the cylinder head on which a valve is to be assembled.

In the embodiment of the invention shown in FIGURES 1 to 8 the assembly apparatus 1 is arranged over a track or guide (not shown) on which pallets 2 carrying the cylinder heads 3 are adapted to be moved so that successive pairs of valves 4 can be indexed under the apparatus for the assembly of a pair of valves 4, springs 5, spring retainers 6 and collar members 7 (FIGURE 6) at each operation of the apparatus; it is however preferred to bring the cylinder head 3 into a fixed position under the apparatus and then to index the apparatus over successive pairs of valves 4 during successive assembly operations, the apparatus being arranged so that it is longitudinally movable on the machine by amounts corresponding to the distances between successive pairs of valves 4.

The pallet 2 includes spring plungers 8 which resiliently press the valve heads 9 on to their seats 10, the free ends of the valve stems 11 extending above the ends of the valve guide bores 12 and the valve springs 5 being mounted on their seats 14 about the ends of the guide bores 12 and the valve spring retainers 6 being mounted freely on the upper ends of the valve springs 5 and about the valve stems 11. The end of each stem 11 has therein an annular groove 19.

These preliminary operations can conveniently be carried out either manually or, preferably, on an automatic assembly apparatus (not shown).

The apparatus 1 for assembling the collar members 7 with the spring retainers 6 on the ends of the valve stems 11 comprises a head 15 which preferably has therein two sets of similar components (of which only one will be described hereinafter) for carrying out the assembly operation on two valves 4 simultaneously during each actuation of the apparatus.

The head 15 is carried by a support 13 which is adapted to be vertically reciprocated, for example by a hydraulic or pneumatic ram (not shown) and has at its lower end a base plate 17 with a shouldered annular recess 18 therein which, when the head 15 is pressed downwardly, is adapted to engage the upper end of the valve spring retainer 6 and press the latter downwardly to a predetermined position, against the compression of the valve spring 5.

Slidably mounted on the base plate 17 of the head 15 is a pair of diametrically opposed horizontally movable carrier plates 20 the inner ends of which partially overlie the opening in the recess 18 in the base plate 17 and are formed with part circular recesses 21 so that they can each engage the outer surface of a split collar member 7.

The outer ends of the carrier plates 20 are normally pressed by springs 22 into abutment with side walls 23 of the head 15 so that the inner ends of the carrier plates 20 are spaced from each other; and the outer end of each carrier plate 20 is formed with an inclined flat cam face 24, said cam faces 24 being engageable by complementary cam faces 25 on a pair of actuators 26 which are slidably mounted in vertical guides 27 in opposite side walls of the head 15. The actuators 26 are adapted to be vertically reciprocated in unison, conveniently by means of a single hydraulic or pneumatic ram 16 mounted on the exterior of the head 15, as shown in FIGURE 1 and connected to arms 28 which are integral with the actuators 26 and extend through vertical slots 30 in the side walls 23 of the head 15. The operation of the actuators 26 in unison by a single ram 16 ensures that a pair of collar members 7 are delivered simultaneously to the end of the valve stem 11.

The head 15 is also formed with a pair of central slideways or chutes 31 for the delivery of the split collar members 7 to the carrier plates 20 for engagement with the upper end of a valve stem 11. The upper ends of the chutes 31 are adapted to have connected thereto magazines 32 containing a plurality of collar members 7 arranged in proper position for delivery down the chute 31, and on to the carrier plates 20, such delivery being controlled by means of a metering mechanism.

The metering mechanism comprises an upper and a lower pair of pivotally mounted trip pawls 33, 34 which are adapted to extend through slots in the walls of each chute 31, the trip pawls 33, 34 being mounted on shafts 35, 36 the rotation of which is adapted to be effected by means of gears 37, 38 mounted respectively on the shafts 35, 36 and operable in sequence by the movement of said actuators 26; one upper pawl 33 and one lower pawl 34 controls the delivery of the collar members 7 in each chute 31, the upper and lower pairs of pawls 33, 34 being arranged to operate in unison. When the lower trip pawl 34 is pivoted so as to be retracted from engagement with the lowermost of a series of collar members 7 in a chute 31 to allow the collar member 7 to drop down the chute 31 on to the carrier plate 20 the upper trip pawl 33 is held in its engaged position so that the overlying collar members 7 are held in the chute 31; similarly, when the lower trip pawl 34 is pivoted so as to extend into the chute 31 after having released a collar member 7, the upper trip pawl 33 is retracted to allow the stack of collar members 7 in the chute 31 to move downwards so that the lowermost will rest on the lower trip member 34. The gearing controlling the operation of the trip pawl 34 is correlated with the movement of the cam actuators 26, so that one pair of collar members 7 is dropped on to the carrier plates 20, and another pair held ready for delivery, upon each operation of the actuators 26.

This correlated movement of the trip pawls is effected, as shown in FIGURES 4 and 7 by means of a roller 40 the axis of which is parallel to that of the shaft 35 and is on the periphery of the gear wheel 37. The roller 40 engages in a recess 41 in the adjacent face of the actuator 26, the recess having at one end thereof inclined faces 42, 43 so that, upon the downward movement of the actuator 26 the inclined face 42 engages the roller and causes the gear wheel 37 to rotate anti-clockwise as viewed in FIGURE 4, the gear wheel 38 which is in mesh therewith thereby being caused to rotate clockwise. Each of the upper pawls 33 has connected to the tail thereof one end of a tension spring 44 the other end of which is anchored to the head 15. The shaft 35 is transfixed by a pin 45 one end of which projects into an arcuate slot 46 which extends circumferentially of the portion of the pawl which is journalled on the shaft 35. In the position of the pawls and the actuator 26 shown in FIGURES 4 and 7 the upper pawl 33 is held engaged with the collar members 7 in the chute 31 by the action of the spring 44. During the downward movement of the actuator 26 the pawls 33 and 34 will be rotated respectively clockwise and anti-clockwise as seen in the figures, but the pin and slot connection 45, 46 between the shaft 35 and the pawl 33 provides a lost-motion connection so that the initial clockwise rotation of the shaft 35 does not cause the pawl 33 to disengage from the collar members 7. The anti-cockwise rotation of the shaft 36 causes the pawl 34 to disengage from the collar members 7 so that the lower of the two collar members 7 shown in FIGURE 7 drops down the chute 31 and comes to rest in the annular space between the upper end of the valve stem 11 and the spring retainer 6.

During the upward movement of the actuator 26 the pawl 34 pivots clockwise so as to project into the chute and the pawl 33 is, when the pin 45 has moved throughout the arcuate distance of the slot 46, pivoted anti-clockwise so as to release the upper of the collar members 7 and allow it to drop on to the projecting end of the lower pawl 34. It will be understood that there will normally be a column of collar members in the magazine 32 and chute 31 and that by the operations described above the collar members are delivered in pairs to the valve spring and retainer assembly upon each reciprocation of the actuator 26.

*Operation*

In order to assemble a split collar, comprising a pair of the collar members 7, on the upper end of a valve stem 11 and to lock the spring retainer 6 in position on the upper end of the valve stem 11 by said collar members 7 a cylinder head 3 mounted on a pallet 2 is indexed so as to bring two valve stems 11 into register under the assembly head 15. Each valve 4 has at this stage a valve spring 5 mounted on its seat 14 on the cylinder head 3 and a spring retainer 6 resting freely on the upper end of the valve spring 5.

The head 15 is then moved downwards by means of the ram (not shown) connected to the support 13 so as to engage the spring retainer 6 and depress it axially of the valve stem 11 by a predetermined distance so that the grooved upper end of the valve stem extends within the lower end of the head with the carrier plates 20 lying approximately in the plane of the groove 19. At this stage a pair of the collar members 7 will be held in the respective chutes 31, resting on the lower pair of trip pawls 34.

The ram 16 controlling the movement of the cam actuators 26 is then brought into operation to move the actuators 26 downwardly, and the initial movement of the actuators 26 operates the trip pawls 34 to release a pair of collar members 7 which drop down the chute 31 and into the annular space between the depressed spring retainer 6 and the upper end of the valve stem 11, the ribs on the collar members being aligned with the groove 19 in the valve stem 11. Upon further movement of the actuators 26 the cam faces 25 at the lower ends thereof engage the cam faces 24 at the outer ends of the carrier plates 20 and, by means of the wedging action therebetween, press the carrier plates 20 inwardly against the action of the springs 22 on the carrier plates 20. This operation causes the inner ends 21 of the carrier plates 20 to engage the collar members 7 and press them inwardly against the upper end of the stem valve, the internal ribs on the collar members 7 thereby engaging in the annular groove 19 in the upper end of the valve stem 11.

The ram 16 controlling the cam actuators is then retracted and the carrier plates 20 are pressed outwardly by their springs 22 so as to discharge from the pair of collar members 7; at the same time the ram controlling the head 15 is operated so as to retract the head upwardly, the spring retainer 6 thereby being allowed to move upwardly on the valve stem 11 under the action of the valve spring 5. This movement continues until the spring retainer 6 engages about the collar members 7, the split collar and the spring retainer thereby being locked on the upper end of the valve stem 11 by the wedging action of the tapered surfaces on the exterior of the collar members 7 and the interior of the spring retainer 6.

The head 15 is then indexed so as to bring another pair of valves 4 in register under the head.

During the retraction of the head 15 and of the cam actuators 26 the trip pawls 33, 34 are operated so that another pair of collar members is released by the upper trip pawls 33 so as to drop down on to the lower trip pawls 34 and a further pair of collar members is then gripped by the upper pair of trip pawls 33. The apparatus is then ready for a further sequence of operations on the next pair of valves 4 in register under the head.

In cases in which the configuration of the cylinder head 3 permits the spring retainers 6 to be depressed well below the level of the grooves 19 the modified form of the assembly apparatus shown in FIGURE 9 may be employed. The construction and operation of this embodiment of the assembly apparatus is substantially the same as that previously described but in this case the carrier plates are formed as members 50 which are adapted to be moved inwardly, for example by means of rams 51 the operation of which is correlated with that of the ram 16 and the actuators 26 so as to bring the semi-circularly recessed inner ends of the carrier plates 50 into engagement with the periphery of the valve stem 11 at a position below the annular groove 19 therein so as to form a support for the lower end of the collar members 7 when they are dropped down the chutes 31. The cam faces 25 on the actuators 26 are adapted to engage complementary cam faces 52 on the outer ends of slides 53 which are slidably mounted on the base plate 17 and are normally pressed by springs 54 into engagement with the side walls 23 of the head 15.

Slidably mounted in horizontal bores in the slides 53 are plungers 55 which are pressed towards the lower ends of the chutes by springs 56 but are normally restrained from moving inwardly by means of stops 57 in the slides which engage collars 58 on the plungers 55.

In the operation of this embodiment of the invention, after the head 15 has been lowered so as to depress the retainer 6 and compress the valve spring 5 the carrier plates 50 are pressed inwardly by the rams 51 so that their inner ends engage about the valve stem 11. A pair of collar members 7 is then dropped down the chutes 31, the collar members coming to rest on the inner ends of the carrier plates 50 with the ribs on the collar members aligned with the grooves 19 on the upper end of the valve stem 11. At the same time the actuators 26 start their downward movement and, when the cam faces 25 thereon engage the cam faces 52 on the slides 53 the latter are moved inwardly so as to bring the inner ends of the plungers 55 into engagement with the collar member 7 and thereby press the latter against the grooved upper end of the valve stem 11. In such position the stops 57 will be disengaged from the collars 58, the plungers 55 being pressed against the collar member 7 by the springs 56.

The carrier plates 50 are then withdrawn and the head 15 is then raised so as to allow the spring retainer 6 to engage about the collar member 7, the actuators 26 also being moved upwardly so that the slides 53 return to their initial positions thereby causing the plungers 55 to be disengaged from the collar member 7 whilst the latter are engaged and secured on the valve stem by the retainer 6. The movement of the actuators 26, in the same manner as in the embodiment previously described, then actuates the trip pawls to ensure that a further pair of collar members will be delivered down the chutes 31 for the next operation of the head.

I claim:

1. Apparatus for operating on a cylinder head having a poppet valve including a stem portion with an annular recess near the end thereof, a valve spring retainer and a valve spring between said retainer and said cylinder head and surrounding the valve stem, said apparatus comprising a vertically reciprocable head member positioned so as to permit the positioning of a cylinder head thereunder, a base plate on said head member and having a recessed portion to engage and depress said spring retainer against the force of said valve spring, feed means on said head member to deliver a pair of split collar members to opposite sides of said valve stem adjacent the annular recess, and engaging means on said head member to move said collar members against said valve stem and into engagement with said annular recess whereby upon retraction of said head member said spring retainer is forced upwardly by said valve spring and into engagement with said split collar members, locking the spring retainer in a predetermined position on the valve stem.

2. Apparatus according to claim 1 wherein said feed means includes a pair of feed chutes in said head and extending from upper locations thereon to lower locations adjacent said valve stem annular recess, said feed chutes being adapted to receive a plurality of split collar members and to retain said members in individual columns within said chutes, a pair of vertically spaced pawls associated with each of said chutes and movable thereinto to engage said split collar members, actuating mechanism interconnecting the pawls of each pair so that when the upper pawl is moved into engagement with a collar member in the chute to retain the column of members thereabove, the lower pawl retracts to permit the lowermost collar member in the column to drop down the chute and when the lower pawl is again moved into position within the chute, the upper pawl retracts to permit the column of pawls to move down the chute a distance equal to the length of one collar member and means interconnecting said feed means and said engaging means for actuation in a predetermined sequence.

3. Apparatus for operating on a cylinder head having a poppet valve including a stem portion with an annular recess near the end thereof, a valve spring retainer and a valve spring between said retainer and said cylinder head and surrounding the valve stem, said apparatus comprising a vertically reciprocable head member positioned so as to permit the positioning of a cylinder head thereunder, a base plate on said head member and having a recessed portion to engage and depress said spring retainer against the force of said valve spring, a pair of feed chutes extending downwardly through said head, terminating near the end of said valve stem to deliver a pair of split collar members to opposite sides of said valve stem adjacent the annular recess, a pair of vertically spaced pawls associated with each of said feed chutes and movable thereinto to retain a column of pawls therewithin, mechanism interconnecting said pawls so that when the upper pawl is moved into said chute to retain a column of collar members thereabove, the lower pawl retracts to permit the lowermost collar member in the column to drop down the chute and when the lower pawl is again moved into position within the chute, the upper pawl retracts to allow the column of pawls to move down the chute a distance equal to the length of one collar member to be retained by said lower pawl, engaging means on said head member to move said collar members against said valve stem and into engagement with said annular recess, said engaging means including a pair of horizontally movable members having opposed inner surfaces to engage said split collar members and having cam surfaces at their outer ends, a pair of vertically movable actuators in said head and having at their lower ends cam faces to bear against said engaging means cam surfaces when said actuators are moved downwardly, thereby to actuate said engaging means inwardly against said split collar members, each of said actuators being connected with one of said pawls to operate said pawls in predetermined relationship with said engaging means and mechanism to operate said head and said vertically movable actuators in predetermined sequence so as to move said head downwardly to depress the spring retainer against the resistance of said valve spring, then to actuate said pawls to permit a pair of collar members to drop down said chutes into position adjacent said valve stem annular recess, then to actuate said engaging means inwardly to press said collar members into engagement with said recess, then to retract said engaging means, then to return said pawls to their original positions permitting the columns of collar members to move down the chute against the lower pawls and finally to move said head upwardly permitting the spring to force the spring retainer into engagement with said collar members, thereby locking the spring retainer in a predetermined position on said valve stem.

4. Apparatus according to claim 3 wherein said engaging means comprise a pair of carrier plates movable on said base plate and including semicircular recesses at their inner ends to engage said split collar members and spring means between said head and said carrier plates to bias said carrier plates outwardly away from said valve stem.

5. Apparatus according to claim 3 wherein said engaging means comprise horizontally movable slide members being spring biased outwardly and carrying movable plungers having inner surfaces to engage said collar members and spring means between said plungers and said slide members to limit the actuating force applied to said collar members, said apparatus further comprising a pair of carrier plates horizontally movable on said base plate to engage said valve stem below said annular recess to form a support for receiving the collar members and locating them in position for actuation by said engaging means into engagement with said annular recess.

6. Apparatus according to claim 5 and further including mechanism operable in predetermined sequence with said head and said actuator operating mechanism to move said carrier plates into engagement with said valve stem after the downward movement of said head and before the delivery of said collar members adjacent the annular recess and to retract said carrier plates after the actuation of said collar members into engagement with said annular recess and before the upward movement of said head.

References Cited by the Examiner
UNITED STATES PATENTS

| 1,779,306 | 10/1930 | Clark | 29—249 |
| 2,437,793 | 3/1948 | Silberman | 29—33.2 |
| 2,966,739 | 1/1961 | Kalbow | 29—211 |
| 2,968,809 | 1/1961 | Foreman et al. | 227—138 |

WHITMORE A. WILTZ, *Primary Examiner.*

THOMAS H. EAGER, *Examiner.*